United States Patent
Watling

(10) Patent No.: US 11,236,829 B2
(45) Date of Patent: Feb. 1, 2022

(54) SEALING RING

(71) Applicant: Carl Freudenberg KG, Weinheim (DE)

(72) Inventor: Simon Watling, Northumberland (GB)

(73) Assignee: CARL FREUDENBERG KG, Weinheim (DE)

( * ) Notice: Subject to any disclaimer, the term of this patent is extended or adjusted under 35 U.S.C. 154(b) by 240 days.

(21) Appl. No.: 16/299,248

(22) Filed: Mar. 12, 2019

(65) Prior Publication Data

US 2019/0285180 A1    Sep. 19, 2019

(30) Foreign Application Priority Data

Mar. 14, 2018  (DE) ............... 10 2018 105 913.2

(51) Int. Cl.
| | |
|---|---|
| *F16J 15/3204* | (2016.01) |
| *F16J 15/3252* | (2016.01) |
| *F16J 15/3232* | (2016.01) |
| *F16F 9/36* | (2006.01) |

(52) U.S. Cl.
CPC ....... *F16J 15/3204* (2013.01); *F16J 15/3232* (2013.01); *F16J 15/3252* (2013.01); *F16F 9/369* (2013.01); *F16F 2230/30* (2013.01)

(58) Field of Classification Search
CPC .. F16J 15/3204; F16J 15/3232; F16J 15/3252; F16F 9/369; F16F 2230/30
See application file for complete search history.

(56) References Cited

U.S. PATENT DOCUMENTS

| | | | | |
|---|---|---|---|---|
| 4,240,643 A | | 12/1980 | Becker et al. | |
| 4,427,206 A | * | 1/1984 | Sugiyama | F16J 15/3216 277/568 |
| 4,616,837 A | * | 10/1986 | Beutel | F16J 15/3232 277/507 |
| 4,709,932 A | * | 12/1987 | Edlund | F16J 15/3208 277/550 |
| 4,881,570 A | * | 11/1989 | Ziebach | F16K 27/045 137/454.2 |
| 4,949,819 A | | 8/1990 | Beutel et al. | |
| 5,263,404 A | * | 11/1993 | Gaucher | F16J 15/56 277/550 |
| 5,303,935 A | * | 4/1994 | Saksun | F16J 15/3224 277/567 |
| 5,368,312 A | * | 11/1994 | Voit | F16J 15/164 277/553 |
| 6,050,572 A | * | 4/2000 | Balsells | F16J 15/3216 277/551 |

(Continued)

FOREIGN PATENT DOCUMENTS

| | | |
|---|---|---|
| DE | 3813037 C1 | 9/1989 |
| EP | 1288538 A2 | 3/2003 |

(Continued)

*Primary Examiner* — Eugene G Byrd
(74) *Attorney, Agent, or Firm* — Leydig, Voit & Mayer, Ltd.

(57) ABSTRACT

A sealing ring includes: a lip ring, with at least one sealing lip; and a supporting ring. The lip ring and the supporting ring are connected to one another. The lip ring and the supporting ring each are formed from an elastomeric material. A modulus of elasticity of the lip ring is smaller than a modulus of elasticity of the supporting ring.

12 Claims, 2 Drawing Sheets

(56) References Cited

U.S. PATENT DOCUMENTS

| | | | |
|---|---|---|---|
| 8,702,106 B2* | 4/2014 | Berckenhoff | F16J 15/166 |
| | | | 277/589 |
| 9,120,526 B2* | 9/2015 | Ogura | B62K 25/08 |
| 9,133,937 B1* | 9/2015 | Reimer | F16J 15/3232 |
| 2006/0006608 A1 | 1/2006 | Laplante et al. | |
| 2008/0073856 A1* | 3/2008 | Munekata | F16J 15/324 |
| | | | 277/559 |
| 2014/0353915 A1* | 12/2014 | Jordan | F16J 15/56 |
| | | | 277/309 |
| 2017/0184202 A1* | 6/2017 | Chen | F16J 15/322 |
| 2020/0049255 A1* | 2/2020 | Kishiro | F16J 15/3252 |

FOREIGN PATENT DOCUMENTS

| | | | | |
|---|---|---|---|---|
| FR | 2404782 A1 | 4/1979 | | |
| JP | 2019157991 A | * 9/2019 | | F16J 15/3284 |

* cited by examiner

SEALING RING

CROSS-REFERENCE TO PRIOR APPLICATION

Priority is claimed to German Patent Application No. DE 10 2018 105 913.2, filed on Mar. 14, 2018, the entire disclosure of which is hereby incorporated by reference herein.

FIELD

The invention relates to a sealing ring comprising a lip ring, with at least one sealing lip, and a supporting ring, wherein the lip ring and the supporting ring are connected to one another.

BACKGROUND

Such a sealing ring is generally known, for example from EP 1 288 538 A2.

The lip ring consists of an elastomeric material and is connected to the supporting body such that it can be released in a non-destructive manner, wherein the lip ring has a clamping bead in which an annular helical spring is arranged. The clamping bead can be secured, under radial prestressing, on a mating surface of the supporting body.

The supporting body may be designed in the form of a housing of shock absorbers or hydraulic/pneumatic subassemblies and consists of a tough/hard material.

A further sealing ring is known from DE 38 13 037 C1. The sealing ring can seal a piston rod of a telescopic shock absorber. The sealing ring comprises a radially inner lip ring made of PTFE and a radially outer supporting ring, which consists of rubber. The lip ring and the supporting ring are connected to one another in one piece.

The supporting ring of the already known sealing ring can consist of rubber, because the lip ring made of PTFE has a good dimensional stability and thus maintains the shape of the sealing ring as a whole. The use of the different materials, in particular the fact that the relatively valuable PTFE material is used very economically just for producing the lip ring, means that the sealing ring as a whole can be produced cost-effectively.

Both sealing rings described above are produced to be essentially circular, and are essentially circular when used as intended, and have a good dimensional stability. This good dimensional stability is achieved in that one of the rings of the already known sealing rings, in this case either the supporting body or the lip ring, consists of a tough/hard, dimensionally stable material.

SUMMARY

In an embodiment, the present invention provides a sealing ring, comprising: a lip ring, with at least one sealing lip; and a supporting ring, wherein the lip ring and the supporting ring are connected to one another, wherein the lip ring and the supporting ring each comprise an elastomeric material, and wherein a modulus of elasticity of the lip ring is smaller than a modulus of elasticity of the supporting ring.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
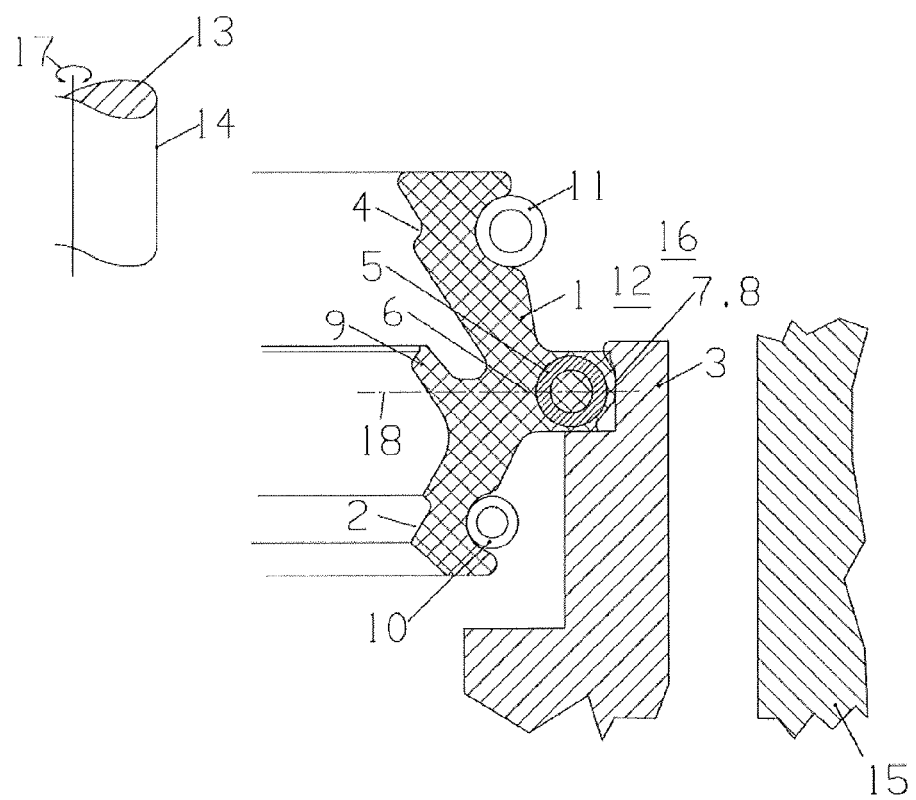
FIG. 1 shows a schematic illustration of the sealing ring according to the invention in the form of a constituent part of a sealing arrangement.

In an embodiment, the present invention provides a sealing ring of the type mentioned in the introduction such that it is, as a whole, less dimensionally stable and sufficiently elastic to allow it to be used even when the machine element to be sealed is non-circular and/or the installation space in which the sealing ring is installed is non-circular.

In particular, it should also be possible for essentially elliptical surfaces to be sealed reliably.

In order to achieve the object, provision is made for the lip ring and the supporting ring each to consist of an elastomeric material, and for the lip ring to have a smaller modulus of elasticity than the supporting ring.

It is advantageous here if neither the lip ring nor the supporting ring consists of a tough/hard, essentially rigid and therefore particularly dimensionally stable material. Rather, the lip ring and the supporting ring both consist of an elastomeric material, and therefore the sealing ring as a whole can be adapted to particularly good effect to the respective use conditions, even when the surface which is to be sealed of a machine element to be sealed is not essentially circular and/or the installation space is non-circular.

Despite these elastomeric properties of the lip ring and supporting ring, it is advantageous if the supporting ring has a greater modulus of elasticity than the lip ring and therefore is somewhat more dimensionally stable than the lip ring and, as a result, supports the lip ring, which is less dimensionally stable in relative terms.

Overall, the sealing ring is thus as compliant as possible and only as dimensionally stable as necessary.

Such a sealing ring can be produced straightforwardly and cost-effectively. The sealing ring is produced to be circular. The lip ring, which is produced to be essentially circular, has its outer circumference enclosed by the supporting ring, which is produced to be essentially circular.

If such a sealing ring is to be used to seal, for example, a non-circular surface, in particular an elliptical surface, in a housing of corresponding configuration, the elastomeric sealing ring can be readily adapted to the non-circular shape when it is being installed. The elastomeric properties of the sealing ring mean that the sealing lip butts with an identical level of elastic prestressing along the entire circumference of the machine element to be sealed, and therefore an undesirably high level of mechanical stressing of the sealing lip is avoided and the sealing ring has consistently good use properties throughout a long service life.

According to an advantageous configuration, provision may be made for the lip ring and the supporting ring each to have a modulus of elasticity of 0.01 to 0.1 N/mm$^2$. Such an elasticity is customary for elastomeric materials. It is thus possible for the sealing ring, which is produced to be essentially circular, to be adapted to good effect to the configuration of surfaces which are to be sealed even when the latter are not essentially circular.

A lip ring having a modulus of elasticity <0.01 N/mm² would be disadvantageous because, as a result, the sealing ring as a whole would not have a sufficient dimensional stability.

If the modulus of elasticity of the supporting ring were >0.1 N/mm², the dimensional stability of the sealing ring as a whole, in contrast, would be too great, and it would no longer be possible for the sealing ring to be adapted to a sufficient extent to the respective use case, as described above.

The ratio of the modulus of elasticity of the supporting ring to the modulus of elasticity of the lip ring is preferably at least 1.25, further preferably 1.25 to 2. Such a ratio is comparatively small, and therefore the lip ring and the supporting ring have levels of elasticity which, although different, do not differ to too great an extent. The supporting ring has a smaller level of elasticity than the lip ring, so that it can perform its supporting function for the lip ring. Were the above described ratio smaller, the supporting action of the supporting ring for the lip ring would be insufficient for most use cases. If, in contrast, the ratio were greater, it would no longer be possible for the sealing ring as a whole to be readily adapted to non-circular surfaces which are to be sealed.

The lip ring and the supporting ring can be connected to one another such that they can be released in a non-destructive manner. Connecting the lip ring and supporting ring in a non-integral manner, such that they can be released in a non-destructive manner, means that these two parts can be changed over separately from one another if required. For use cases in which the lip ring has a high level of abrasive wear, for example as a result of a rod which is to be sealed, and can be moved back and forth in the axial direction, being used in a highly contaminated environment or of the medium which is to be sealed containing a large number of abrasive particles, it is advantageous if a lip ring which has become worn over the service life of the sealing ring can be straightforwardly removed from the supporting body and replaced by a new lip ring. In such a case, the mechanical connection between the lip ring and supporting ring is based predominantly on radial prestressing, by way of which the lip ring is arranged in the supporting ring.

The lip ring and the supporting ring can be connected to one another in a force-fitting and/or form-fitting manner.

According to another configuration, provision may be made for the lip ring and the supporting ring to be connected to one another integrally. This results in the lip ring and the supporting ring forming a non-separable unit. In the case of such a configuration, it is advantageous that undesirable relative movements between the lip ring and the supporting ring during installation of the sealing ring, and also when the latter is used as intended, are reliably ruled out. The risk of defective installation is minimized.

The lip ring can have in each case at least one sealing lip on its radially inner circumference and at either end. The sealing lips may be curved axially outwards in opposite directions in order to seal axially adjacent spaces in relation to one another. One of the sealing lips, for example, is curved outwards in the direction of a sealing-arrangement space which is to be sealed, and medium which is to be sealed is thereby sealed in a space which is to be sealed. The other sealing lip, which is directed axially away from the space which is to be sealed, prevents, for example, contaminants from the surroundings from penetrating in the direction of the space which is to be sealed. The two sealing lips may have a common root, from which they extend in axially opposite directions.

For static sealing of the lip ring in the supporting ring, provision may be made for the lip ring to have at least one sealing bead on its radially outer circumference, axially between the sealing lips. The sealing bead can form the common root mentioned above.

The sealing ring may be designed to be essentially symmetrical in relation to an imaginary radial plane extending axially and centrally through the sealing bead, wherein, of the sealing lips described above, one is arranged axially on one side of the imaginary radial plane and the other is arranged axially on the other side of the imaginary radial plane.

A helical compression spring with a radially outwardly active spring force may be arranged in the sealing bead. Such a helical compression spring retains the lip ring under radial prestressing in the supporting ring. This rules out any undesirable relaxation of the sealing bead, and the lip ring and supporting ring are secured on one another reliably.

The helical compression spring is preferably continuous and annular, and therefore the sealing bead is subjected to a corresponding level of radial prestressing along its entire circumference.

The helical compression spring is preferably completely enclosed by the material of the lip ring. By virtue of the helical compression spring being completely encased by the material of the lip ring, the helical compression spring is reliably protected against corrosion. There is therefore no need for time-consuming and cost-intensive treatment of the helical compression spring for example with a corrosion-protection layer.

The inner cavity of the helical compression spring, said cavity being bounded on the outside by the turns of the helical compression spring, can be completely filled by the material of the lip ring. Such a configuration significantly simplifies the production of the lip ring, because there is no need to provide for sealing of the inner cavity during vulcanization of the lip ring. The straightforward production means that the sealing ring as a whole can be produced straightforwardly and cost-effectively.

The sealing bead has a contact surface on its outer circumference, the contact surface being in sealing contact, under radial elastic prestressing, with a mating surface of the supporting ring.

In particular when the lip ring is connected to the supporting ring such that it can be released in a non-destructive manner, it is particularly necessary to ensure reliable sealing between the contact surface and mating surface.

It is advantageous, for this purpose, if the contact surface and the mating surface are essentially congruent.

If, in contrast, the lip ring and the supporting ring are connected to one another integrally, a congruent configuration of the contact surface and mating surface is likewise advantageous. This gives rise to a connecting surface which is large overall, and is advantageous for reliable connection between the lip ring and supporting ring.

In order to improve the sealing action, provision may be made for the lip ring to have an auxiliary seal on its radially inner circumference, axially between the sealing lips and on the radially inner side of the sealing bead. As a result of the auxiliary seal, the sealing lip which is arranged axially in the direction of a space which is to be sealed is provided with even better protection against being subjected to the action of contaminants from the surroundings.

The axial interspace between the sealing lips, arranged at either end, may be filled, if required, with a barrier grease, in order for the sealing action of the sealing ring to be improved. It is also the case that the barrier grease lubricates the sealing lips, which are not subjected directly to the action of the medium which is to be sealed. As a result of the lubricating action, abrasive wear to the sealing lips and/or the auxiliary seal is reduced to a considerable extent and the sealing ring has consistently good use properties throughout a long service life.

It is preferable for at least one of the sealing lips to have its radially outer circumference, and further preferable for all the sealing lips to have their radially outer circumferences, enclosed by an annular-coil spring with a radially inwardly active spring force. This means that the sealing lips seal in a reliable manner even when there is only a particularly small difference in pressure, if any at all, between the two spaces which are to be sealed. As a result of use being made of annular-coil springs, possible relaxation of the elastomeric material of the lip ring is immaterial in practice because the annular-coil springs ensure that the sealing lips are pressed radially onto the surface which is to be sealed of the machine element to be sealed.

FIG. 1 shows the sealing ring according to the invention, which is arranged in an installation space 12 of a sealing arrangement. The installation space 12 is bounded on the radially inner side by a machine element 13 to be sealed and has a surface 14 which is to be sealed, and on the radially outer side by a housing 15, by means of which the machine element 13 to be sealed is enclosed, at a radial distance, on the outer circumference. The gap 16 formed by the radial distance forms the installation space 12.

In the exemplary embodiment shown here, the machine element 13 which is to be sealed has a surface 14 which is to be sealed, the surface being non-circular. The machine element 13 to be sealed, as seen in cross section, is elliptical. The machine element 13 to be sealed may be, for example, the tube of a telescopic damper, the tube having an elliptical cross section.

That wall of the housing 15 which bounds the installation space 12 is of corresponding design, and therefore that wall of the housing 15 which bounds the installation space 12 is configured in adaptation to the surface 14 which is to be sealed and is likewise elliptical.

The radial extent of the gap 16, as seen in the circumferential direction 17 of the machine element 13 to be sealed, is constant.

The lip ring 1 and the supporting ring 3 each consist of an elastomeric material, wherein the supporting ring 3 has a lower level of elasticity than the lip ring 1, so that it can support the lip ring 1.

In the exemplary embodiment shown here, the ratio of the modulus of elasticity of the supporting ring 3 to the modulus of elasticity of the lip ring 1 is 1.25 to 2.

The lip ring 1 has the sealing lips 2, 4 on its radially inner circumference and at either end, wherein, as seen in the axial direction, the auxiliary seal 9 is arranged between the sealing lips 2, 4. The two sealing lips 2, 4 and the auxiliary seal 9 enclose in a sealing manner, under radial prestressing, the surface 14 which is to be sealed and belongs to the machine element 13 to be sealed.

The sealing lips 2, 4 have their radially outer circumferences enclosed in each case by the corresponding annular-coil spring 10, 11 with a radially inwardly active spring force.

The sealing ring is designed to be essentially symmetrical in relation to the imaginary radial plane 18 which extends in the radial direction and axially and centrally through the sealing bead 5. The sealing bead 5 has a contact surface 7 on an outer circumference of the at least one sealing bead 5, the contact surface 7 being in abutting contact, under radial elastic prestressing, with a mating surface 8 of the supporting ring 3.

The helical compression spring 6 is arranged in the sealing bead 5 and uses its radially outwardly active spring force to ensure radial prestressing, by way of which the lip ring 1 is arranged in the supporting ring 3.

The helical compression spring 6 has its outer circumference completely enclosed, and its inner circumference completely filled, by the elastomeric material of the lip ring 1.

The supporting ring 3 forms a static sealing means in relation to the housing 15.

Figure 2:
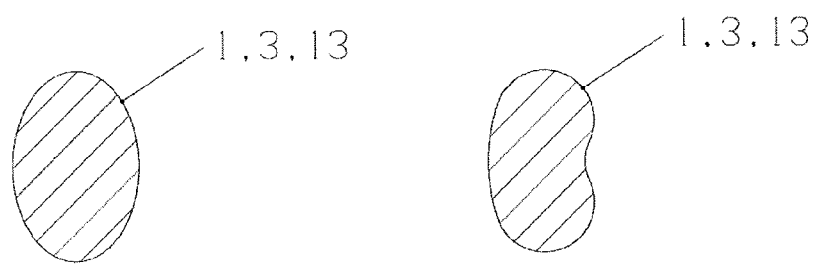
FIG. 2 shows different cross sections of the machine element to be sealed.
Figure 2:
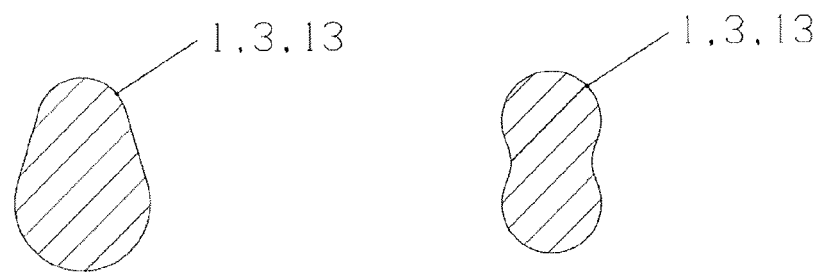
Figure 2:
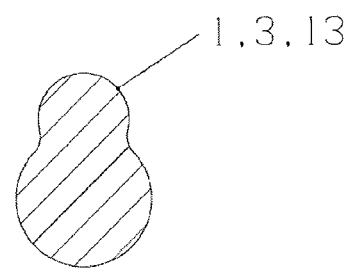

FIG. 2 shows different cross sections of the machine element 13 to be sealed. As described above, the cross sections may be essentially elliptical.

It is also possible for oval, droplet-shaped, kidney-shaped or essentially figure-8 cross sections to be sealed by the sealing ring according to the invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A sealing ring, comprising:
   a lip ring, with at least one sealing lip; and
   a supporting ring,
   wherein the lip ring and the supporting ring are connected to one another,
   wherein the lip ring and the supporting ring each comprise an elastomeric material,
   wherein a modulus of elasticity of the lip ring is smaller than a modulus of elasticity of the supporting ring,
   wherein the at least one sealing lip comprises a first sealing lip and a second sealing lip,
   wherein the first and second sealing lips are disposed on a radially inner circumference of the lip ring and at either end of the lip ring,
   wherein the lip ring has at least one sealing bead on a radially outer circumference of the lip ring, axially between the first and second sealing lips, and wherein a helical compression spring with a radially outwardly active spring force is arranged in the at least one sealing bead.

2. The sealing ring according to claim 1, wherein the lip ring and the supporting ring each have a modulus of elasticity of 0.01 to 0.1 N/mm$^2$.

3. The sealing ring according to claim 1, wherein a ratio of the modulus of elasticity of the supporting ring to the modulus of elasticity of the lip ring is at least 1.25.

4. The sealing ring according to claim 3, wherein the ratio is 1.25 to 2.

5. The sealing ring according to claim 1, wherein the lip ring and the supporting ring are connected to one another such that they are releasable in a non-destructive manner.

6. The sealing ring according to claim 5, wherein the lip ring and the supporting ring are connected to one another in a force-fitting and/or form-fitting manner.

7. The sealing ring according to claim 1, wherein the lip ring and the supporting ring are connected to one another integrally.

8. The sealing ring according to claim 1, wherein the at least one sealing bead has a contact surface on an outer circumference of the at least one sealing bead, the contact surface being in abutting contact, under radial elastic pre-stressing, with a mating surface of the supporting ring.

9. The sealing ring according to claim 8, wherein the contact surface and the mating surface are congruent.

10. The sealing ring according to claim 1, wherein the lip ring has an auxiliary seal on a radially inner circumference of the lip ring, axially between the first and second sealing lips and on a radially inner side of the at least one sealing bead.

11. The sealing ring according to claim 1, wherein at least one of the sealing lips has its radially outer circumference enclosed by an annular-coil spring with a radially inwardly active spring force.

12. The sealing ring according to claim 9, wherein all the sealing lips have their radially outer circumferences enclosed in each case by an annular-coil spring with a radially inwardly active spring force.

* * * * *